Patented June 21, 1938

2,121,580

UNITED STATES PATENT OFFICE 2,121,580

HYDROGENATION OF OITICICA OIL AND PRODUCT THEREFROM

Julius F. T. Berliner and Caryl Sly, Wilmington, Del., assignors to E. I. du Pont de Nemours & Company, Wilmington, Del., a corporation of Delaware No Drawing. Application August 11, 1937, Serial No. 158,538

15 Claims. (Cl. 260—106)

This invention relates to catalytic hydrogenation processes, and more particularly to the hydrogenation of oiticica oil.

This invention has as its object the preparation of new and useful compounds by hydrogenating oiticica oil. Another object is the catalytic hydrogenation of a glyceride of 4-keto-delta-9,11,13-octadecanetrienoic acid. A further object is the preparation of materials selected from the group consisting of the glyceride of 4-keto-stearic acid, the glyceride of 4-hydroxy stearic acid, 1,4-octadecanediol, and stearyl alcohol by catalytic hydrogenation processes. Still another object is the preparation of a member selected from the group consisting of the glyceride of 4-keto-stearic acid, the glyceride of 4-hydroxy stearic acid, 1,4-octadecanediol, and stearyl alcohol by the catalytic hydrogenation of a glyceride of 4-keto-delta-9,11,13-octadecanetrienoic acid. Other objects will appear hereinafter.

The above objects may be accomplished by the catalytic hydrogenation of oiticica oil or the glyceride of 4-keto-delta-9,11,13-octadecanetrienoic acid at elevated temperatures. This process also includes the separate hydrogenation of intermediate products.

Oiticica oil contains approximately 80% of the glyceride of 4-keto-delta-9,11,13-octadecanetrienoic acid, and it has been possible, because of this unusual structure, to hydrogenate the oil in three distinct steps.

(1) The three olefin bonds were hydrogenated with a nickel catalyst by keeping the temperature of the reaction under 125° C., or under 150° C. when using a copper chromite catalyst. The product in this case is a wax-like material, containing about 80% of the glyceride of 4-keto stearic acid. This glyceride was saponified to yield 4-keto stearic acid which was then hydrogenated to the lactone of 4-hydroxy stearic acid (free 4-hydroxy stearic acid spontaneously goes over to the lactone). By controlling the amount of hydrogen absorbed in this step the degree of saturation can be controlled.

(2) The saturated keto-glyceride, as obtained in Step (1), was then hydrogenated to the saturated hydroxy glyceride by raising the temperature 20° to 50° C. By operating in a range of 150° to 200° C., oiticica oil was likewise hydrogenated to the saturated hydroxy-glyceride, the double bonds and the ketone group being hydrogenated.

(3) Finally the oil under conditions of ester hydrogenation, e. g., copper-chromite catalyst at 250° to 300° C. gave a mixture of 1,4-octadecanediol and stearyl alcohol. In this case the double bonds and the ketone group were hydrogenated by the time ester hydrogenation started.

The following examples illustrated the preferred embodiment of the invention without limiting the invention thereto.

Example I

Into a small autoclave, equipped with mechanical agitation, were charged 3630 grams of oiticica oil and 180 grams of a reduced nickel catalyst supported on kieselguhr. The reaction mixture was then heated under 1000 lbs. per sq. in. hydrogen pressure. At 80° C. hydrogen absorption started, the reaction was exothermic to 110° to 115° C., and at this temperature absorption ceases after 30 minutes. The tan colored wax-like product, melting at 60° to 65° C., had an iodine number of less than 10, a hydroxyl number of 13, a high ketone number of about 95, and a saponification number practically identical with that of the original oil.

A sample of this product was saponified and the resulting acids recrystallized, first from alcohol and then from acetone. By this procedure a 40% yield of pure 4-keto stearic acid, M. P. 94° to 96° C., was obtained.

Example II

One hundreds fifty grams of the product from Example I, 50 grams of methanol and 15 grams of Raney nickel catalyst were charged into a small autoclave. The contents of the reaction tube were then heated to 150° C. at 1500 to 3000 lbs. per sq. in. pressure of hydrogen until absorption of hydrogen had ceased. Analysis of the product indicated that it was essentially the glyceride of 4-hydroxy stearic acid.

Example III

One hundred fifty grams of the product from Example I, 15 grams of a barium promoted copper chromite catalyst were heated to 250° C. at 2000 to 3000 lbs. per sq. in. hydrogen pressure with constant agitation for four hours. The crude mixture of alcohols thus obtained had a hydroxyl number of 242. Distillation, followed by recrystallization, gave approximately 2 parts of stearyl alcohol, M. P. 55° to 57° C., and 1 part 1,4-octadecanediol, M. P. 71° to 72° C.

Example IV

Two hundred grams of oiticica oil and 20 grams of barium promoted copper chromite catalyst were treated under the conditions of Example III. Here, long before 250° C. was reached, the double bonds and ketone group present in the oil were hydrogenated. As in the above example, the product was a mixture of stearyl alcohol and 1,4-octadecanediol.

Certain conditions of pressure, temperature, etc. are indicated in the examples which may be varied within the scope of this invention. The hydrogen pressure is not particularly critical for any of the steps and may vary from 5 to 300 atmospheres. Below 5 atmospheres the hydrogenation would probably proceed very slowly and certainly for the ester hydrogenation would be slow even at 50 or 100 atmospheres. The upper limit of pressure would be determined by either the compression equipment available or the safe operating pressure of the reaction equipment, but it is doubtful if any practical advantage would be secured by operating above 300 atmospheres.

There are three distinct temperature ranges which determine the extent of the hydrogenation.

(1) At temperatures between 50° and 150° C. the double bonds are hydrogenated. When the hydrogenation is carried out using active nickel as the catalyst, it is preferred to operate within the range of 50° to 120° C., with the preferred temperature about 100° C. For the less active copper-chromite type catalysts, it is preferred to operate at a temperature within the range of 100° to 150° C., with the preferred temperature about 130° C.

(2) At temperatures between 125° and 200° C. the ketone group hydrogenates. This reaction, however, is preceded by the hydrogenation of the double bonds. With the active nickel catalysts it is preferred to operate at temperatures within the range of 125° to 175° C., preferably at a temperature of about 150° C. whereas with the copper chromite type catalysts it is preferred to operate within the range of 150° to 200° C., preferably at a temperature of about 175° C.

(3) At temperatures between 200° and 400° C. ester hydrogenation occurs, this hydrogenation being preceded by the double bond and ketone reduction. It is preferred to operate in this case with a copper-chromite type catalyst at temperatures between 260° and 270° C.

Hydrogenating catalysts in general are operable in this process. The catalyst may consist of any suitable hydrogenating metals or metallic oxides, either massive or supported on such materials as silica, activated carbon, alumina, or a naturally occurring earth such as kieselguhr. Metallic catalysts may be promoted with oxide promoters such as manganese oxide, zinc oxide and chromium oxide. For the hydrogenation of the double bonds and the ketone group, it is preferable to use reduced nickel or cobalt catalysts because they operate at low temperatures. As indicated in the examples either a physical mixture or chemical compound of copper and chromium oxide, e. g., copper chromate or copper chromite, are particularly useful for ester reduction. Other metals such as zinc, cadmium, iron, barium, etc., or mixtures of the various metals as chromites may likewise be used. It is preferable to use chromite type catalysts for the ester reduction because of their sturdy character and freedom from tendencies to promote side reactions. In carrying out the processes of this invention from 1% to 10% by weight of catalyst may be used, depending upon the specific catalyst composition, apparatus, etc.

While all of the examples were made in a static system the process may also be carried out in equipment adapted to continuous flow. The oil may be mixed with catalyst and forced with an excess of hydrogen through tubes heated to the required temperature or the oil and excess hydrogen may be passed over a heated catalyst. Substantially the same conditions of catalyst, temperature, etc., as discussed above, would be operative here.

By means of this invention it is possible to produce readily, and for the first time from a natural oil, wax-like keto-glycerides with a wide range of melting points, depending on the degree of saturation allowed. Such products are of interest for a variety of uses such as in wax emulsions, polishes, blending agents for other waxes, cosmetic creams, and the like. The active ketone group offers additional opportunity for further modification by chemical reactions. The saturated hydroxy-glyceride can be considered isomeric with "Opalwax" and therefore potentially useful in the same arts. The new compound 1,4-octadecanediol can be converted to various esters, ethers, etc., which find application in the field of plastics, coated fabrics, and resins. Sulphated 1,4-octadecanediol might also be used in detergents and emulsifying agents.

It is apparent that many widely different embodiments of this invention may be made without departing from the spirit and scope thereof and therefore it is not intended to be limited except as indicated in the appended claims.

We claim:

1. The process which comprises reacting oiticica oil with hydrogen in the presence of a hydrogenation catalyst at an increasing temperature between 50° and 400° C.

2. The process which comprises reacting oiticica oil with hydrogen in the presence of a hydrogenation catalyst at a temperature between 50° and 150° C. so as to form the glyceride of 4-keto stearic acid, increasing the temperature to within the range of 125° to 200° C., and continuing the hydrogenation so as to form a glyceride of 4-hydroxy stearic acid, further increasing the temperature to within the range of 200° to 400° C. and continuing the hydrogenation so as to form 1,4-octadecanediol and stearyl alcohol.

3. The process which comprises reacting a glyceride of 4 - keto - delta - 9,11,13-octadecanetrienoic acid with hydrogen in the presence of a copper-chromite catalyst at a temperature between 100° and 150° C. so as to form the glyceride of 4-keto stearic acid, increasing the temperature within the range of 150° to 200° C. and continuing the hydrogenation to form a glyceride of 4-hydroxy stearic acid, further increasing the temperature within the range of 200° to 300° C., and further continuing the hydrogenation to form 4-octadecanediol and stearyl alcohol.

4. The process which comprises reacting a glyceride of 4 - keto - delta - 9,11,13-octadecanetrienoic acid with hydrogen in the presence of a nickel catalyst at a temperature between 50° and 120° C. so as to form a glyceride of 4-keto stearic acid, increasing the temperature to between 125° and 175° C. and continuing the hydrogenation so as to form the glyceride of 4-hydroxy stearic acid, separating said glyceride of 4-hydroxy stearic acid and reacting same with hydrogen in the presence of a copper chromite catalyst at a temperature between 200° and 300° C. so as to form 4-octadecanediol and stearyl alcohol.

5. The process of producing a glyceride of 4- keto-stearic acid which comprises reacting a glyceride of 4-keto-delta-9,11,13-octadecanetrienoic acid with hydrogen in the presence of a hydrogenation catalyst at a temperature between 50° and 150° C.

6. The process in accordance with claim 5 characterized in that the reaction is carried out in the presence of a nickel catalyst and at a temperature between 50° and 120° C.

7. The process in accordance with claim 5 characterized in that the reaction is carried out in the presence of a copper chromite catalyst and at a temperature between 100° and 150° C.

8. A process for the production of a glyceride of 4-hydroxy stearic acid, which comprises reacting a glyceride of 4-keto stearic acid with hydrogen in the presence of a hydrogenation catalyst at a temperature between 125° and 200° C.

9. The process in accordance with claim 8 characterized in that the reaction is carried out in the presence of a nickel catalyst at a temperature between 125° and 175° C.

10. The process in accordance with claim 8 characterized in that the reaction is carried out in the presence of a copper-chromite catalyst at a temperature between 150° and 200° C.

11. A process for the production of 1,4-octadecanediol and stearyl alcohol which comprises reacting a glyceride of 4-hydroxy stearic acid with hydrogen in the presence of a hydrogenation catalyst at a temperature between 200° and 400° C.

12. The process in accordance with claim 11 characterized in that the reaction is carried out in the presence of a copper chromite catalyst at a temperature between 250° and 300° C.

13. The process which comprises reacting a glyceride of 4-keto-delta-9,11,13-octadecanetrienoic acid with hydrogen in the presence of a copper-chromite catalyst at an increasing temperature between 250° and 300° C. and recovering the 4-octadecanediol and stearyl alcohol formed.

14. The process which comprises reacting a glyceride of 4-keto stearic acid with hydrogen in the presence of a copper chromite catalyst at an increasing temperature between 250° and 300° C. and recovering the 1,4-octadecanediol and stearyl alcohol formed.

15. As a new compound 1,4-octadecanediol.

JULIUS F. T. BERLINER.
CARYL SLY.